(12) United States Patent
Affolter et al.

(10) Patent No.: US 10,791,867 B2
(45) Date of Patent: Oct. 6, 2020

(54) BREWING DEVICE HAVING TWO BREWING CHAMBERS

(71) Applicant: Delica AG, Birsfelden (CH)

(72) Inventors: Roland Affolter, Möriken (CH); Markus Brönnimann, Hermrigen (CH); Miles Zhao, Shenzhen (CN)

(73) Assignee: DELICA AG, Birsfelden (CH)

(*) Notice: Subject to any disclaimer, the term of this patent is extended or adjusted under 35 U.S.C. 154(b) by 400 days.

(21) Appl. No.: 15/564,432

(22) PCT Filed: Mar. 22, 2016

(86) PCT No.: PCT/EP2016/056246
§ 371 (c)(1),
(2) Date: Oct. 5, 2017

(87) PCT Pub. No.: WO2016/162204
PCT Pub. Date: Oct. 13, 2016

(65) Prior Publication Data
US 2018/0132650 A1    May 17, 2018

(30) Foreign Application Priority Data
Apr. 8, 2015   (CH) .......................... 489/15

(51) Int. Cl.
*A47J 31/36*    (2006.01)
*A47J 31/44*    (2006.01)

(52) U.S. Cl.
CPC ....... *A47J 31/3623* (2013.01); *A47J 31/3676* (2013.01); *A47J 31/4403* (2013.01)

(58) Field of Classification Search
CPC . A47J 31/3623; A47J 31/3676; A47J 31/4403
See application file for complete search history.

(56) References Cited

U.S. PATENT DOCUMENTS

2008/0121111 A1    5/2008   Paget et al.
2009/0308259 A1*   12/2009  Hiron ................... A47J 31/368
                                                        99/323.3

FOREIGN PATENT DOCUMENTS

EP      1327407 A2    7/2003
WO      WO-2014183783 A1 *  11/2014 .......... A47J 31/3633

OTHER PUBLICATIONS

International Preliminary Report on Patentability dated Oct. 10, 2017 issued in corresponding International Application No. PCT/EP2016/056246.
International Search Report dated Apr. 29, 2016 in corresponding International Patent Application No. PCT/EP2016/056246.
PCT/ISA/237 issued in corresponding International Application No. PCT/EP2016/056246.

* cited by examiner

*Primary Examiner* — Ibrahime A Abraham
*Assistant Examiner* — Dilnessa B Belay
(74) *Attorney, Agent, or Firm* — Nath, Goldberg & Meyer; Jerald L. Meyer

(57) ABSTRACT

The invention relates to a brewing device having two separate brewing chambers, comprising two capsule receptacles and two closure elements for the two brewing chambers, and a gearing for the actuation of the two closure elements, the gearing comprising a common drive element, and two output elements for the two brewing chambers.

15 Claims, 5 Drawing Sheets

BREWING DEVICE HAVING TWO BREWING CHAMBERS

Figure 1:
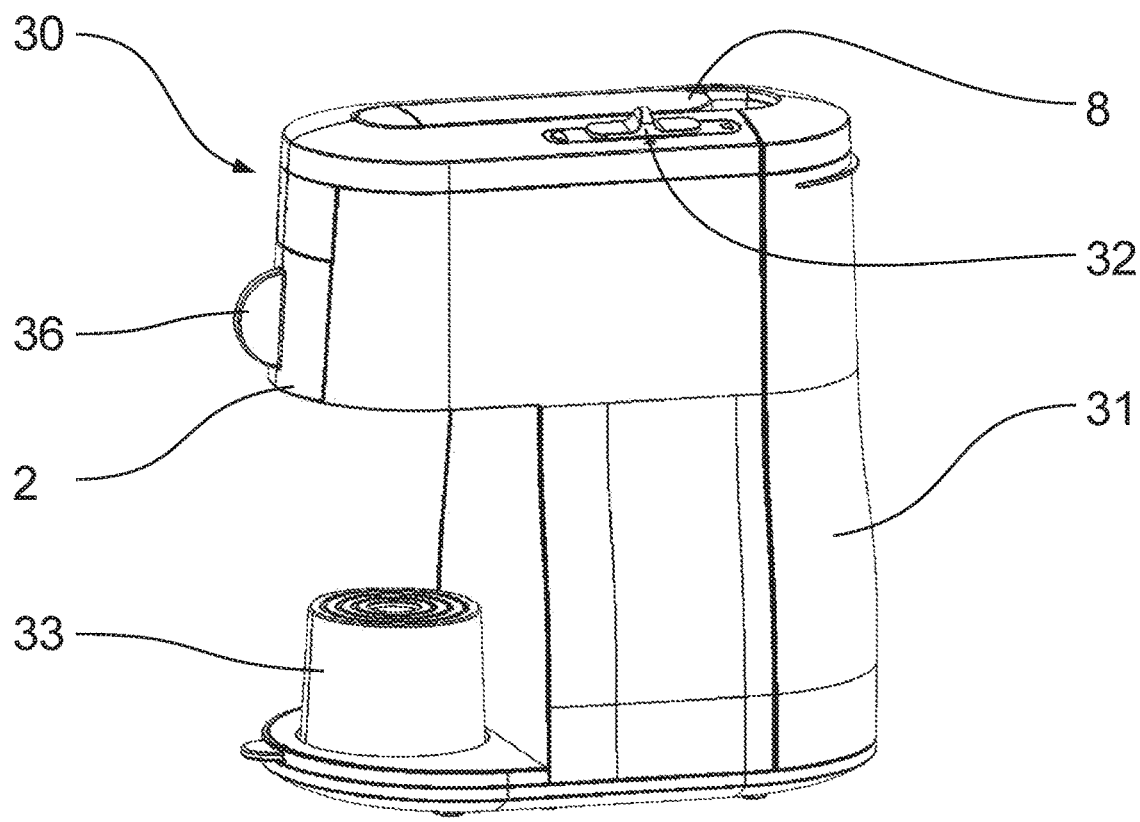

This is a National Phase Application filed under 35 U.S.C. 371 as a national stage of PCT/EP2016/056246, filed Mar. 22, 2016, an application claiming the benefit of Swiss Application No. 00489/15 filed Apr. 8, 2015, the content of each of which is hereby incorporated by reference in its entirety.

The present invention relates to a brewing device which is intended for a beverage-making machine for capsules according to the preamble of claim 1 and has two brewing chambers, in particular for making beverages by means of single-serve capsules.

The prior art has already disclosed a multiplicity of beverage-making machines having corresponding brewing devices which use a capsule to provide portioned beverage units. Also already known are machines which, for the purpose of making a multi-component beverage, e.g. in the form of a latte or a cappuccino, can accommodate two different capsules which are processed simultaneously and/or sequentially.

For example, EP 1 327 407 B1 discloses a device for extracting a beverage substance, use being made of a holder for a plurality of capsules. Accordingly, a plurality of brewing chambers are also present in order to be able to dispense a corresponding beverage.

EP 2 227 120 B1 discloses a device for making various kinds of beverage. This device has two holders for single-serve capsules, which can be detected by the machine and brewed accordingly.

EP 1 961 351 B1 discloses a brewing unit and a beverage maker which have at least a first and a second accommodating chamber for corresponding capsules. The two capsules are processed sequentially, and it is therefore possible to produce, for example, layered beverages.

The disadvantage of the prior art is that the brewing chambers for accommodating the two capsules and also the corresponding closure unit are coupled to one another in each case such that they are closed simultaneously. In particular in the case of extraction taking place under high pressure, this results in sealing-related problems, since the contact pressure to which the capsule is subjected when the brewing chamber is being closed cannot be adapted individually.

The object of the invention is to overcome the disadvantages of the prior art. In particular, the intention is to make available a brewing device having two separate brewing chambers and also a corresponding beverage-making machine which both allow the brewing chambers to be closed individually.

This object is achieved by a brewing device having the features of claim 1. Further embodiments can be gathered from the dependent patent claims.

A beverage-making machine is understood to mean, in particular, a machine which, using single-serve capsules, can produce all kinds of liquid (luxury) food. There is no distinction drawn here as to whether the food made is coffee, tea, milk-containing products, instant soups, baby food or energy drinks. However, the machine is, in particular, one which, using a single-serve capsule having a food substance, injects a liquid into the capsule to dissolve, extract, brew, etc., the food substance. A capsule is also understood to mean, in particular, a pad.

A brewing device according to the invention which is intended for a beverage-making machine for capsules and has two brewing chambers comprises a first capsule holder and a first closure element for the first brewing chamber and a second capsule holder and a second closure element for the second brewing chamber. The brewing device also has a mechanism for actuating the two closure elements. According to the invention, the mechanism comprises a common drive member, a first output member for the first brewing chamber and a second output member for the second brewing chamber. The two output members are configured such that the first closure element of the first brewing chamber and the second closure element of the second brewing chamber are driven separately.

A mechanism is understood here, and hereinbelow, to mean an element which can be used to alter movement-related variables, for example force, torque, movement direction, type of movement, etc. In particular, a mechanism is also understood to mean a toothed-gear mechanism, cam mechanism, a lever or toggle-lever mechanism, a chain mechanism, a wedge-gear and/or toothed-belt mechanism, friction-gear mechanism and any combinations of different types of mechanism.

Since each brewing chamber or each closure element has a dedicated output member, it can be ensured that, for example, a displacement or distance traveled by the closure element, or else a contact pressure to which the capsule holder is subjected by the closure element, can be adjusted individually, that is to say separately for each brewing chamber. Accordingly, the brewing chambers can be closed individually.

The closure elements may be connected to one another such that they can be moved to a limited extent. Accordingly, this gives rise to the movements of the two closure elements being synchronized. Moved to a limited extent is understood to mean that the connection deliberately can be provided with an amount of play, and therefore, despite the synchronization, individual closure of the brewing chambers is possible.

The mechanism may have a toothed-gear mechanism. Using a toothed-gear mechanism makes it possible to achieve transmission both of the force and of the distance, for example, very straightforwardly. It is thus, for example, possible for a brewing device to be equipped such that a user of the brewing device has to apply only a very small amount of force in order to be able to close the brewing chambers with a high level of contact pressure.

The mechanism may have a cam mechanism. Since the mechanism has a cam mechanism, a rotary movement can be converted very straightforwardly into a linear translatory movement. Moreover, movement sequences with a complex force/distance diagram are therefore conceivable.

The two output members may comprise two gearwheels which can be rotated in the same direction and each have a cam disk. Since the two output members rotate in the same direction, it is possible for the output members to be placed closer to one another. In the case of the output members rotating, the cam disks do not collide since they are rotated in the same direction. It is also possible for the drive member to be placed between the two output members and to drive these directly. Using gearwheels ensures a direct force fit and there is no possibility of undesirable misalignment occurring. It is also ensured that the drive acts simultaneously on both output members. Since the cam disk is arranged directly on the gearwheel of the corresponding output member, it is possible, once again, for a rotary movement to be converted directly into a, for example, linear translatory movement. Moreover, a cam disk can provide for individual adjustment of both the resultant force and of the resultant distance traveled by the corresponding closure element.

Each closure element may have an engagement member, which interacts with a control curve of the corresponding cam disk. Using an engagement member in a control curve of the cam disk is a straightforward way of converting a rotary movement into a translatory movement.

The output members along with the gearwheel and cam disk may be configured in one piece. This ensures straightforward installation capability. The output members may be produced from a plastics material, and they can therefore be made in a cost-effective manner, for example by injection molding. Moreover, depending on the plastics material selected, the cam disk has only a low level of friction in relation to the engagement member and also a low level of wear in relation to the drive member. Accordingly, it is possible to ensure a constant closing force even over a large number of closing movements.

The control curve may have a dead center, the closure element being locked by the engagement member when the dead center is passed. Such a dead center makes it possible for the closure element not to be raised up from the capsule holder when a beverage is being made, this operation usually taking place under high pressure in the brewing chamber. In particular, the force to which the drive member is subjected is interrupted. Accordingly, it can be ensured that the brewing chamber is closed with sealing action. There is no need for any additional locking means.

The engagement member may be arranged in the closure element by means of an eccentric sleeve. By virtue of being arranged by means of an eccentric sleeve, precision adjustment of the positioning of the closure element can be carried out by a straightforward rotation of said sleeve. Of course, for this purpose, the eccentric sleeve has to be mounted in a rotatable manner in the closure element. As an alternative, it is also possible for the engagement member itself to be of eccentric configuration, in which case the additional sleeve can be done away with. It is irrelevant here whether the engagement member is of eccentric configuration in the region where it engages in the cam disk and/or in the region where it is fastened in the closure element.

The eccentric sleeve or the eccentric engagement member may be fixed by means of a securing element, in particular in the form of a securing pin or a securing clip, so as to prevent an undesirable rotary movement. For this purpose, the eccentric sleeve or the eccentric engagement member has, for example, a bore or a clamping surface for accommodating the securing element. Of course, depending on the configuration, the closure element also has a bore or a clamping surface for accommodating the securing element.

The eccentric sleeve or the eccentric engagement member may be capable of being fixed in a plurality of, in particular in 2, 3 or 4, different positions. Accordingly, for example a plurality of bores or clamping surfaces are present in order to accommodate the securing element.

Each closure element may be capable of being displaced from a closed position into an open position. Displacement of the closure element into an open position allows, for example, straightforward access to the capsule holder.

There may be a displacement travel of, for example, 0.5 mm to 50 mm, preferably of 7 mm to 35 mm, particularly preferably of 15 mm to 25 mm, between the closed position and the open position.

The closure elements may have a rectilinear guide, and each of these rectilinear guides predetermines a movement direction of the closure elements. Said rectilinear guide can ensure that the closure elements do not skew as they move into the closed position and, accordingly, that the capsule holder is closed uniformly all the way round. For example, it is thus possible to provide for a sealing surface of the closure element in a plane-parallel manner on a corresponding sealing surface of the capsule holder or of a capsule arranged in the capsule holder. The rectilinear guide may also have an amount of play, and therefore self-adjustment of the orientation of the closure elements takes place.

An amount of displacement travel between the closed position and the open position and/or a contact-pressure force of the closure elements in the closed position can be adjusted separately for each brewing chamber. It is therefore possible to have different adjustments for the two brewing chambers. Moreover, the configuration of the control curve on the corresponding cam disk can influence both the displacement travel and the contact-pressure force of the closure elements. Using a suitable control curve makes it possible to provide different adjustments, for example, for even the forces and/or distances traveled during opening and/or during closure. Of course, the resultant displacement travel is the same both for the opening operation and for the closing operation.

The brewing chambers may be configured differently, in particular it is possible for the first brewing chamber to have a piercing plate and for the second brewing chamber to have one or more injector needles for penetrating a cover and for injecting a liquid into a capsule accommodated in the corresponding brewing chamber. It is likewise conceivable for the brewing chambers to be of different sizes. It is therefore possible, for example, for capsules from different manufacturers and/or having different contents and/or different content volumes to be accommodated.

The piercing plate and the injector needle may each be arranged on the appropriate closure element of the brewing chamber. This arrangement ensures that, when the brewing chamber is being closed, that is to say when the closure element is being moved into the closed position on the capsule holder, a cover or a base of a capsule is penetrated, and therefore a liquid can pass into the capsule. Depending on the configuration of the capsule or the contents of the capsule, it is advantageous if use is made of a piercing plate with a plurality of penetration elements or else of an injection needle with just one or more water inlets.

A seal which directly seals the penetration opening on the capsule cover may be arranged all the way around the injection needle. Since a high pressure usually prevails in the capsule interior as a result of the liquid injected, the cover is pressed against said seal. This can prevent the situation where the water, or even the food made, exits through the penetration opening and soils the brewing chamber.

The mechanism may be configured such that it subjects the closure element to force in a center-symmetrical manner, in particular on both sides. For example, an engagement member of the closure engagement can engage in a control curve of the output member on both sides of the closure element. A center-symmetrical action of force can ensure that the closure element is positioned as uniformly as possible in the capsule holder and closes the latter all the way round. The mechanism as a whole may be of mirror-symmetrical construction, and therefore, for each closure element, the output members and the cam disks are arranged on both sides. For example, it is possible for a drive lever to be configured with a toothed ring, which interacts with a central gearwheel. This central gearwheel is connected, for example by way of its rotary shaft, directly to the drive member which drives the output members. A drive member may be arranged on both sides of the central gearwheel, on the rotary shaft thereof, and this makes a mirror-symmetrical construction a straightforward matter. The mirror symmetry has the advantage that forces can be passed on to the following member or members of the mechanism in a torque-free manner. This eliminates the risk of skewing of the closure elements at least in one direction.

The capsule holders may be arranged in an in particular common insert unit, which can be removed from the brewing device. Arranging the capsule holders in a removable insert unit allows very straightforward changeover and/or refilling of the capsule holders with the corresponding capsules. At the same time, the capsule holder can be cleaned easily. Arranging the capsule holders in a common insert unit further simplifies handling. Corresponding guide rails may be present both on the insert unit and on the brewing device, or on a housing of the brewing device, and said guide rails make it possible for the insert unit to be straightforwardly removed and reinserted. The guide rails may have latching elements in order to indicate correct insertion of the insert unit.

A further aspect of the present invention relates to a beverage-making machine which comprises a brewing device as described above. Such a machine makes it possible, for example, to make a multi-component beverage using, for example, a coffee capsule and a milk capsule. Of course, the beverage-making machine has to have means appropriate for example for heating up water and injecting it into the two brewing chambers.

Figure 2:
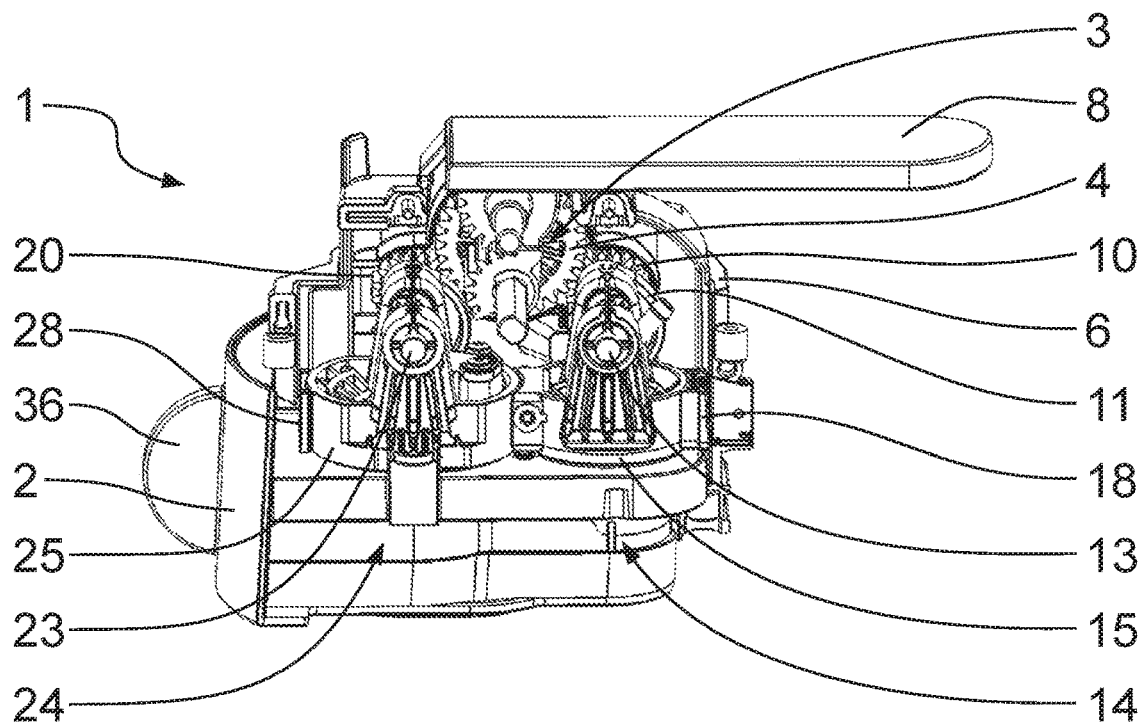
Figure 3:
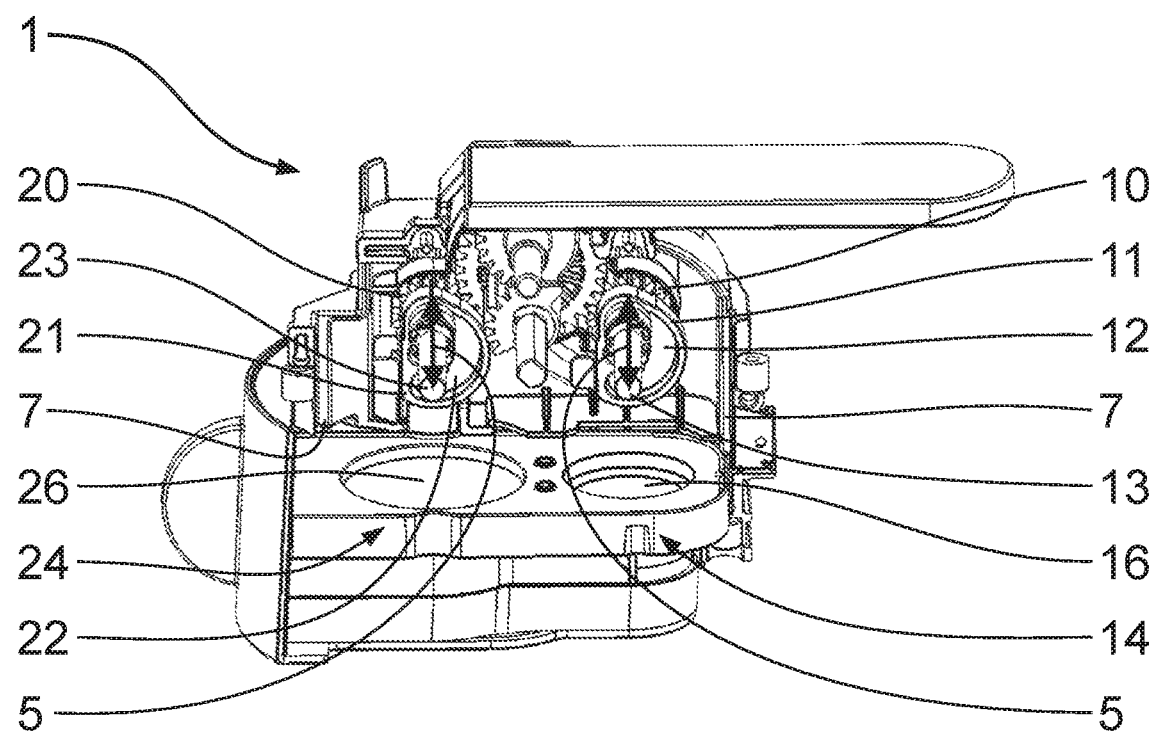
Figure 4:
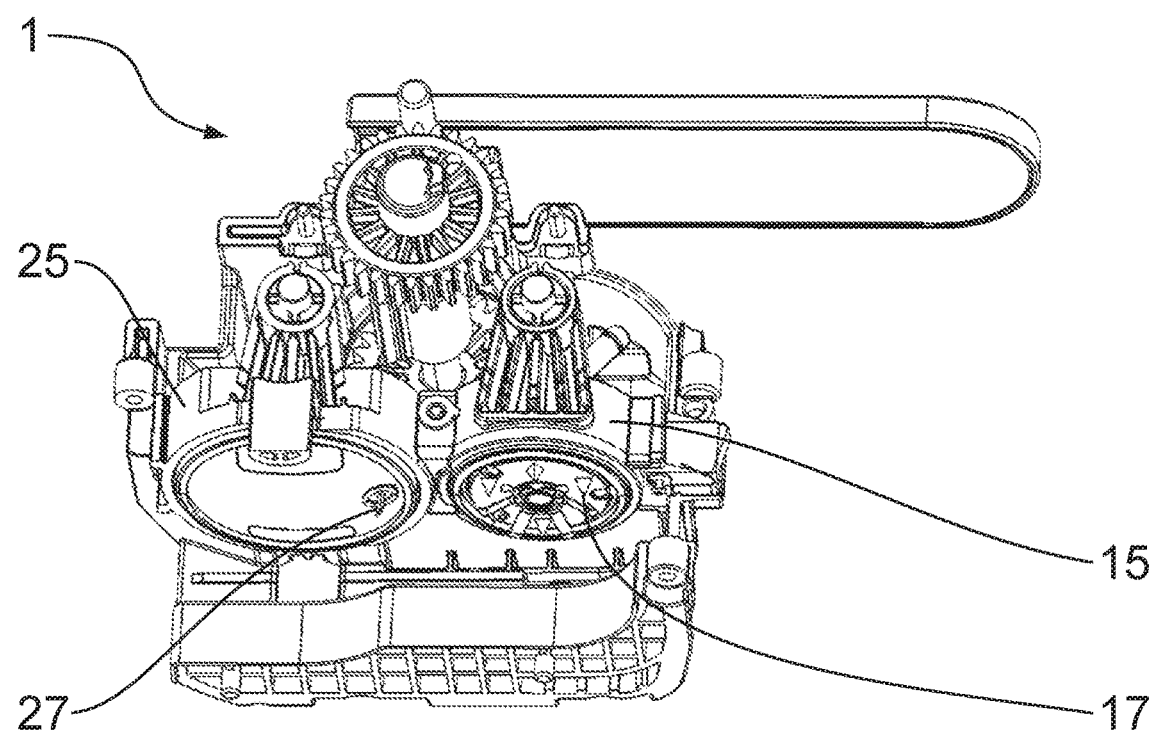
Figures 5A, 5B:
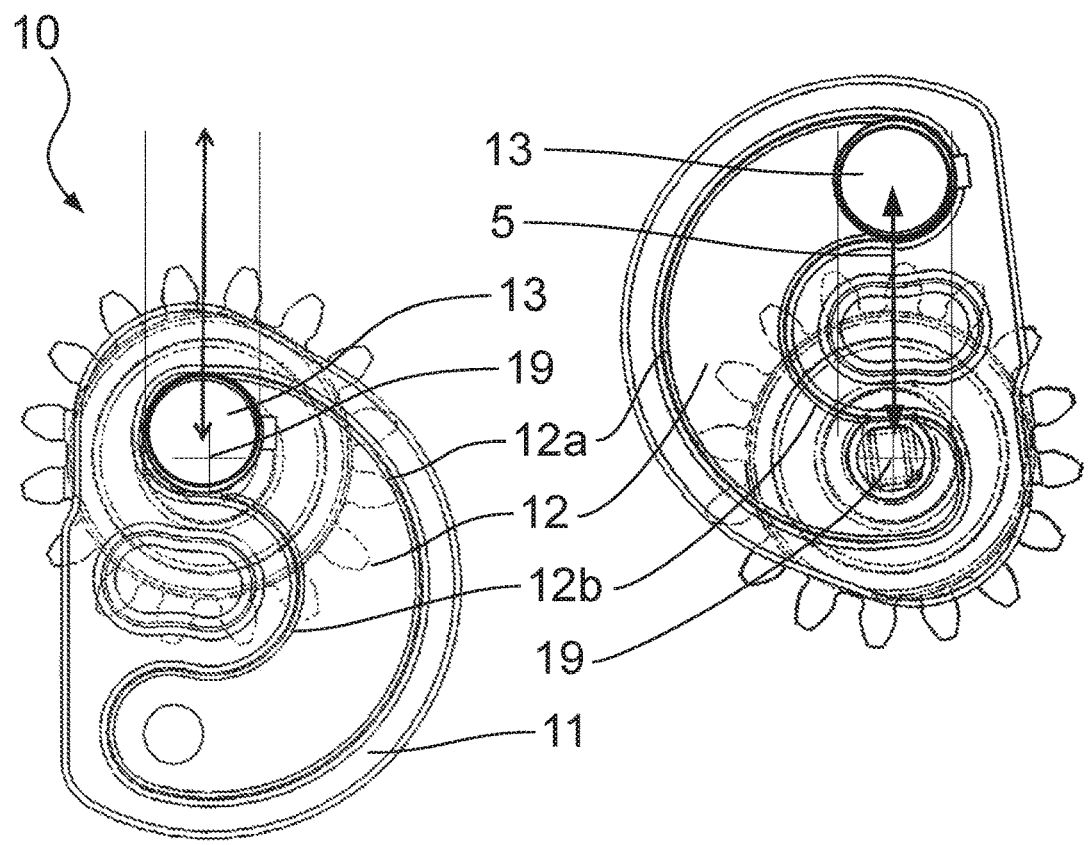
Figure 6:
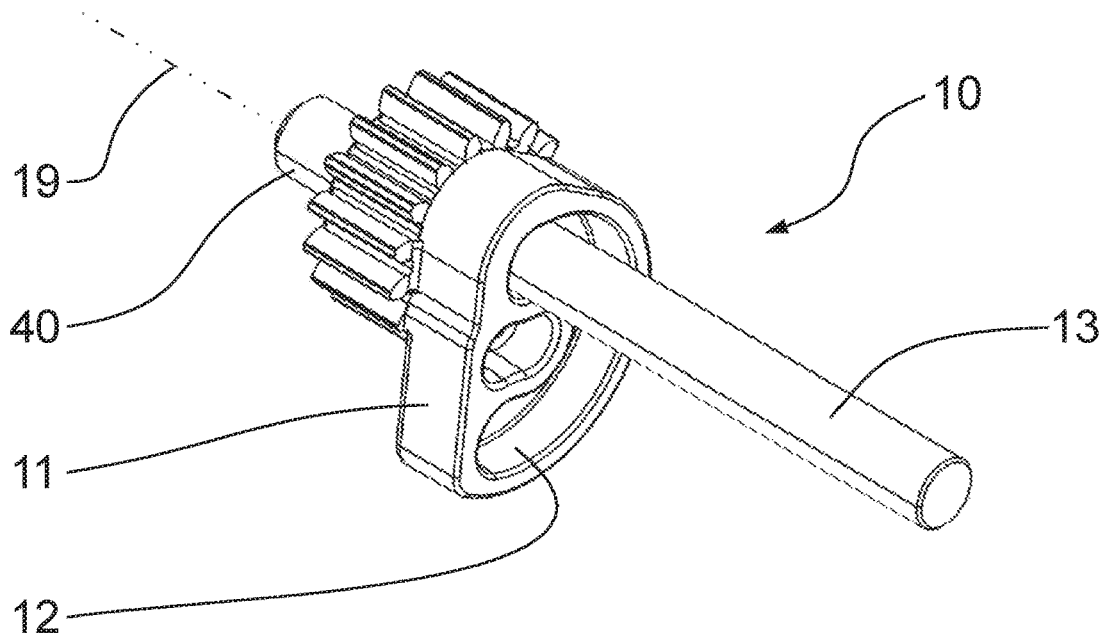
Figure 7:
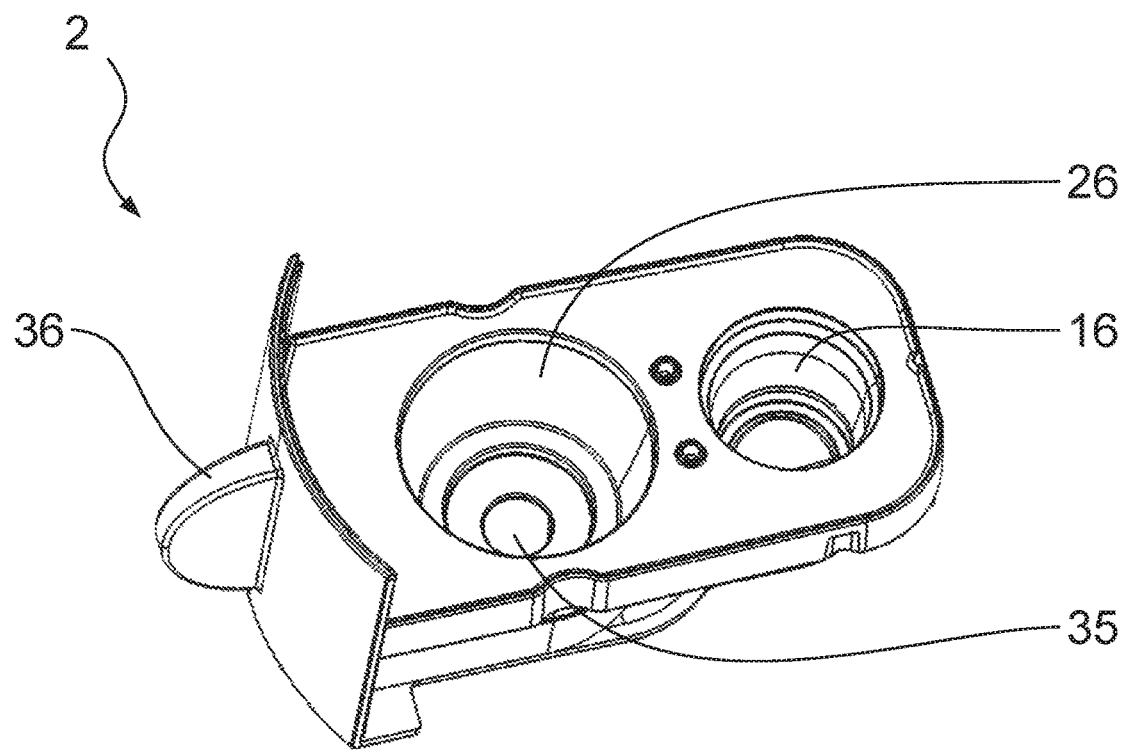
Figure 8:
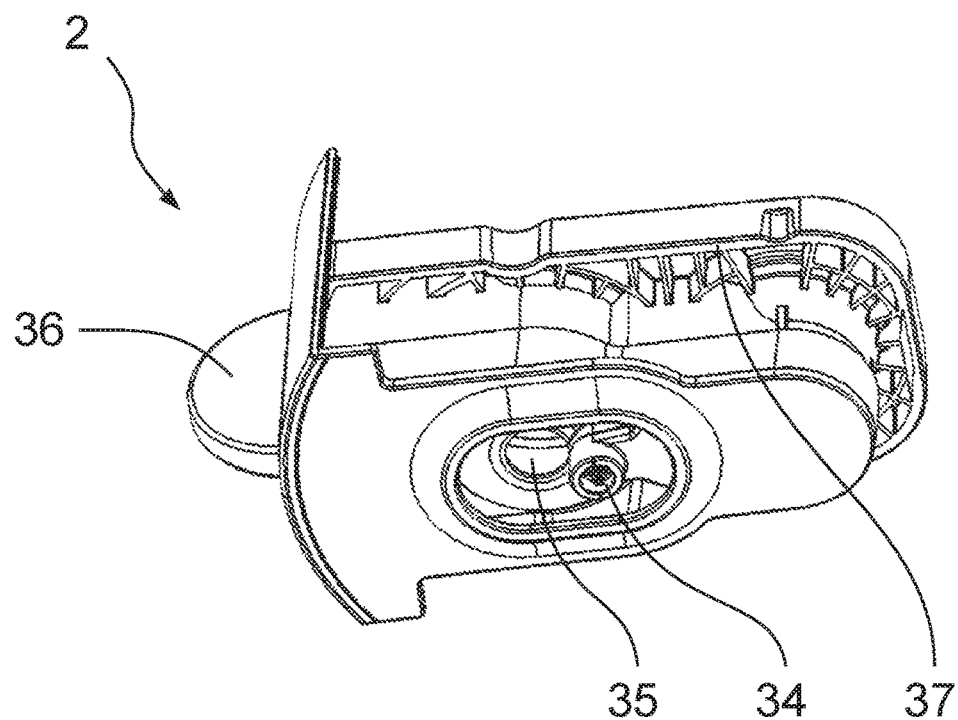
Figure 9:
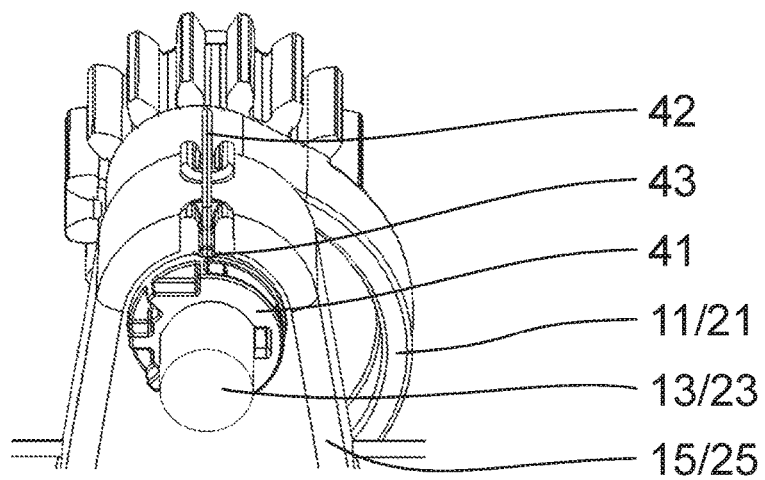
Figures 10A, 10B, 10C:
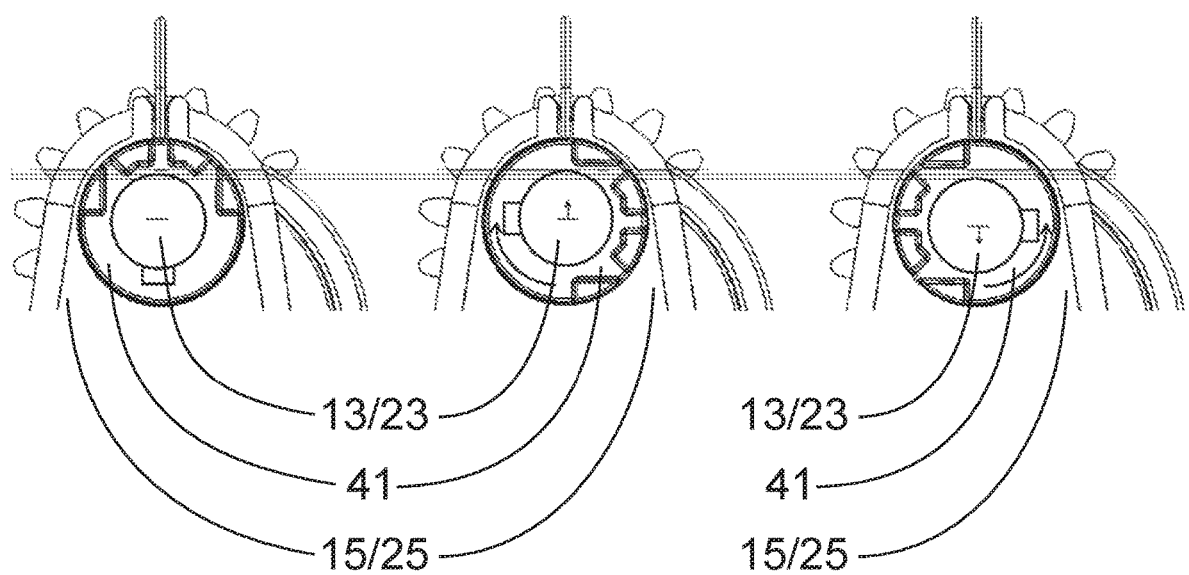

The invention will be explained in more detail hereinbelow with reference to figures, which merely illustrate exemplary embodiments and in which FIG. 1 shows a perspective view of a beverage-making machine according to the invention, FIG. 2 shows a brewing device according to the invention, part of the housing having been removed, FIG. 3 shows the brewing device from FIG. 2, the closure elements of the two brewing chambers having been removed in addition, FIG. 4 shows a perspective view from beneath of the brewing device from FIG. 2 with the insert unit removed, FIG. 5*a* shows a semi-transparent illustration of an output member with a corresponding engagement member, FIG. 5*b* shows the output member from FIG. 5*a*, the output member having executed a rotary movement, FIG. 6 shows a perspective illustration of the output member and the engagement member from FIG. 5, FIG. 7 shows a perspective illustration of an insert unit with two different capsule holders, FIG. 8 shows a perspective illustration from beneath of the insert unit from FIG. 7, FIG. 9 shows an enlarged illustration of the region of the engagement element and of the latter arranged by means of an eccentric sleeve in the closure element according to FIGS. 2 and 4, FIG. 10*a* shows a view of the eccentric sleeve according to FIG. 9 for the precision adjustment of the closure element, in a first position, FIG. 10*b* shows a view of the eccentric sleeve according to FIG. 9 for the precision adjustment of the closure element, this time in a second position, and FIG. 10*c* shows a view of the eccentric sleeve according to FIG. 9 for the precision adjustment of the closure element, this time in a third position.

FIG. 1 shows a perspective view of a beverage-making machine 30 according to the invention. Clearly evident are a drive lever 8 and a control element 32, both of which are arranged on the upper side of the beverage-making machine 30. In addition, a water tank 31 is arranged in a known manner on the rear side of the beverage-making machine 30. A cup rest 33, which also serves as a drip grid, is illustrated on the side located opposite the water tank 31. Likewise evident on this side of the beverage-making machine 30 is an insert unit 2, which has a handle 36 and can be removed from the beverage-making machine 30 and provided with single-serve capsules. The beverage-making machine 30 is equipped with a brewing device 1 (see FIGS. 2 to 4), so as to be able to make a liquid food from the single-serve capsules.

FIG. 2 shows a brewing device 1 according to the invention having two brewing chambers 14, 24. Part of the housing 6 has been removed here so as to give a view of the interior of the brewing device 1. Clearly evident, once again, is the insert unit 2, which has its handle 36 and, as already described in relation to FIG. 1, can be removed from the beverage-making machine or the brewing device 1 in order to be provided with coffee capsules. The brewing device 1 is illustrated in the closed state, that is to say the brewing chambers 14, 24 are closed. A drive lever 8 can be used to actuate a mechanism 3, which makes it possible for the brewing chambers 14, 24 to be open by virtue of two closure elements 15, 25 being raised. The mechanism 3 has a drive member 4 in the form of a gearwheel, of which the shaft is driven, via a central gearwheel, directly by a toothed ring of the drive lever 8. This drive member 4 drives, on each side, two output members 10, 20, which likewise have a gearwheel structure. The output members 10, 20 both have a cam disk 11, 21 (see FIG. 3), by means of which the rotary movement of the output member 10, 20 is converted into a translatory displacement movement of the closure elements 15, 25. The closure elements 15, 25 each have an engagement member 13, 23, which engages in, and interacts with, a control curve 12, 22 (see FIG. 3) of the corresponding cam disk 11, 21. In order to ensure rectilinear displacement travel, the closure elements 15, 25 have rectilinear guides 18, 28, which interact with corresponding guide rails 7 (see FIG. 3). The mechanism 3 is of mirror-symmetrical construction, the elements on the one side having been removed. The plane of symmetry here runs centrally and perpendicularly through an axis of rotation of the drive lever 8 and centrally through the two closure elements 15, 25. In specific terms, this means, however, that the mechanism has two drive members, which are arranged on both sides of the central gearwheel and of the plane of symmetry. Accordingly, it is also the case that two output members along with a cam disk are present for each closure element. It is thus possible for the engagement members of the two closure elements to have both ends engaging in the corresponding cam disks, in which case there is no risk of skewing.

FIG. 3 shows the brewing device 1 from FIG. 2, the two closure elements 15, 25 (see FIG. 2) having been removed in addition. Accordingly, there is a free view of two capsule holders 16, 26, which, together with the corresponding closure elements, form the brewing chambers 14, 24. Of the two closure elements, it is only the two engagement members 13, 23 which are illustrated, these interacting with the cam disks 11, 21 of the two output members 10, 20. The two cam disks 11, 21, for this purpose, have control curves 12, 22, in which the two engagement members 13, 23 are mounted in a displaceable manner. Removing the two closure elements also gives a view of the guide rails 7 on the housing of the brewing device 1, said guide rails, together with the corresponding rectilinear guides 18, (see FIG. 2), enforcing rectilinear displacement of the two closure elements in a defined movement direction 5.

FIG. 4 depicts a perspective view from beneath of the brewing device 1 from FIG. 2 with the insert unit removed. This makes it possible to see the penetration means of the closure elements 15, 25. The first closure element 15 is provided with a piercing plate 17, which has a plurality of piercing spikes. Such a piercing plate 17 is advantageous, in particular, when the intention is to penetrate a cover of a capsule of which the contents need to be wetted simultaneously and uniformly over a relatively large surface area. This is the case, for example, for a coffee capsule. The second closure element 25, in contrast, has an injector needle 27, which can penetrate in a syringe-like manner through the cover of a corresponding capsule and therefore allows a liquid to be injected directly into the capsule. It is also likewise conceivable to have a plurality of injector needles, in which case the cover of a capsule is pierced at a plurality of locations and the liquid is injected through a plurality of needles. This way of introducing a liquid is advantageous when the contents of the capsule are to be swirled up and mixed thoroughly during injection of the liquid, this being desirable in particular when a food substance is being dissolved.

FIGS. 5a and 5b are semi-transparent illustrations of an output member 10 with an engagement member 13. Those regions of the output member which are arranged on the rear side are illustrated by dotted lines. FIG. 5a here shows the engagement member 13 in its position when the brewing chamber is closed, while FIG. 5b illustrates the engagement member 13 in its position when the brewing chamber is open, that is to say when the closure element has been raised up. The semi-transparent illustration shows a rear-side gearwheel-toothing formation, which interacts with the drive member 4 (see FIG. 2). It can likewise be seen that the output member 10, in addition to the gearwheel-toothing formation, also comprises a cam disk 11 with a control curve 12. The engagement member 13 is mounted in a movable manner in said control curve 12. The output member 10 from FIG. 5a can rotate in the counterclockwise direction about an axis of rotation 19, which, in the case of the engagement member 13 being fixed laterally, results in a translatory displacement movement in the movement direction 5. The lateral guidance of the engagement member 13 is illustrated by vertical auxiliary lines. In FIG. 5b, the rotation of the output member 10 has been completed and the displacement travel of the engagement member 13 has been completed. The control curve 12 is configured in the form of a curved groove in the cam disk 11. The corresponding side walls 12a, 12b of the control curve force the engagement member 13 to execute the displacement movement. When the brewing chamber is closed, that is to say when the closure elements have been lowered as illustrated in FIGS. 2 and 3, the cam disk 11 has been rotated to the extent where the engagement member 13 has exceeded a dead center in the control curve 12 and is therefore blocked in position. Even a high press-in pressure in the closed brewing chamber, which may be up to 20 bar, is not capable of raising up the closure element from the capsule holder. It is only a rotation of the cam disk 11 as brought about by the drive lever which makes it possible for the engagement member 13, and therefore the closure element, to be moved away again from its locked position and raised.

FIG. 6 depicts a perspective illustration once again of the drive member 10 with the engagement member 13 from FIG. 5. It is clearly evident here that the cam disk 11 has a control curve 12. Also evident is a shaft 40, which serves for fastening the output member 10 in a rotatably mounted manner in the housing of the brewing device. Accordingly, said shaft 40 also defines the axis of rotation 19.

FIGS. 7 and 8 each illustrate a perspective view of an insert unit 2, FIG. 7 showing a view from above and FIG. 8 showing a view from beneath. The insert unit 2 has two different capsule holders 16, 26, which are provided for accommodating different single-serve capsules. The insert unit 2 is also provided with a handle 36, which provides for straightforward removal from a beverage-making machine 30 (see FIG. 1). In order for the liquid food made in the two capsule holders 16, 26 to be able to flow out into a single cup, a beverage outlet 34 and an outlet opening 35 can be seen on the underside of the insert unit 2. The beverage outlet 34 serves as an outlet for the first capsule holder 16. The outlet opening 35 of the second capsule holder 26 is configured such that use can be made here of a capsule with a corresponding outlet nozzle, wherein the outlet nozzle of the capsule fits through the outlet opening 35. The outlet nozzle of the capsule here serves directly as the beverage outlet for the liquid food from the capsule in the capsule holder 26. The insert unit 2 is configured in the manner of a slide and has, on both sides, guide elements 37 which fit into corresponding guide tracks of a brewing device or of a beverage-making machine.

FIG. 9 shows an enlarged illustration of the region of the engagement element 13, 23 and of the latter arranged by means of an eccentric sleeve 41 in the closure element 15, 25 according to FIGS. 2 and 4. The engagement elements 13, 23 is configured here in the form of a cylindrical bolt and is mounted in the eccentric sleeve 41. A rotation of the eccentric sleeve 41 makes it possible for the orientation of the closure element 15, 25 to be displaced by a minimal amount in relation to the engagement element 13, 23, see, in this respect, FIGS. 10a to 10c. Such relative displacement can influence the absolute position of the closure element 15, 25 for example in its closed position. Accordingly, tolerances, which are unavoidable in particular during production, can be corrected, and therefore sealed closure of the brewing chamber is nevertheless possible. In order to avoid undesirable adjustment of the eccentric sleeve 41, both the eccentric sleeve 41 and the closure element 15, 25 have at least one bore 43 for accommodating a securing pin 42. The securing pin 42 here is curved to form a clip. The eccentric sleeve 41 has four bores 43, and therefore the sleeve can be fixed in a plurality of rotary positions. Of course, it is also conceivable to have more than four bores and, accordingly, more rotary positions.

FIGS. 10a to 10c illustrate different positions of the eccentric sleeve 41. Three auxiliary lines in the figures mark the relative displacements between the engagement element 13, 23 and closure element 15, 25. FIG. 10a illustrates the eccentric sleeve 41 in a central position. In FIG. 10b, the upper auxiliary line shows the relative displacement between the engagement element 13, 23 and the closure element 15, 25 which has been achieved by the eccentric sleeve 41 being rotated through 90°. Analogously, FIG. 10c shows the eccentric sleeve 41 in a third position. The third auxiliary line indicates that the displacement between the engagement elements 13, 23 and the closure element 15, 25 has taken place in this case in the opposite direction.

The invention claimed is:

1. A brewing device which is intended for a beverage making machine for capsules and has two separate brewing chambers, comprising a first capsule holder and a first closure element for the first brewing chamber and a second capsule holder and a second closure element for the second brewing chamber, further comprising a mechanism for actuating the first and second closure elements, wherein the mechanism comprises a common drive member and a first output member for the first brewing chamber and a second output member for the second brewing chamber, wherein the mechanism further comprises a toothed-gear mechanism, the first output member comprising a first gearwheel, the second output member comprising a second gearwheel, the first and second gearwheels being adapted for rotation in the same direction, the first gearwheel having a first cam disk and the second gearwheel having a second cam disk, the first cam disk being arranged directly on the first gearwheel of the first output member, and the second cam disk being arranged directly on the second gearwheel of the second output member.

2. The brewing device as claimed in claim 1, wherein the mechanism has a cam mechanism.

3. The brewing device as claimed in claim 1, wherein each of said first and second closure elements has an engagement member, which interacts with a control curve of the corresponding one of the first and second cam disks.

4. The brewing device as claimed in claim 3, wherein the control curve has a dead center, the respective one of the first and second closures element being locked by the corresponding engagement member when the dead center is passed.

5. The brewing device as claimed in claim 3, wherein the engagement member is arranged in the corresponding one of the first and second closure elements by means of an eccentric sleeve.

6. The brewing device as claimed in claim 1, wherein the first and second closure elements have a rectilinear guide, and each of these rectilinear guides predetermines a movement direction of the first and second closure elements.

7. The brewing device as claimed in claim 1, wherein an amount of displacement travel between a closed position and an open position or a contact pressure force of the first and second closure elements in the closed position or both can be adjusted separately for each of the first and second brewing chambers.

8. The brewing device as claimed in claim 1, wherein the first and second brewing chambers have at least one of different sizes and different structures with respect to one another.

9. The brewing device as claimed in claim 8, wherein the first brewing chamber has a piercing plate and the second brewing chamber has one or more injector needles for penetrating a cover and for injecting a liquid into a capsule accommodated in the corresponding one of the first and second brewing chambers.

10. The brewing device as claimed in claim 9, wherein the piercing plate and the injector needle are arranged on an appropriate one of the first and second closure elements of the first and second brewing chambers.

11. The brewing device as claimed in claim 8, wherein the first and second brewing chambers are configured to accommodate capsules having at least one of different contents, different sizes and different content volumes with respect to one another.

12. The brewing device as claimed in claim 1, wherein the mechanism is configured such that it subjects each of the first and second closure elements to force in a center symmetrical manner on both sides.

13. The brewing device as claimed in claim 1, wherein the first and second capsule holders are arranged in an insert unit, which can be removed from the brewing device.

14. The brewing device as claimed in claim 13, wherein the first and second capsule holders are arranged in one common insert unit.

15. A beverage making machine comprising a brewing device as claimed in claim 1.

* * * * *